United States Patent
Satyanarayana et al.

(10) Patent No.: US 10,193,811 B1
(45) Date of Patent: Jan. 29, 2019

(54) FLOW DISTRIBUTION USING TELEMETRY AND MACHINE LEARNING TECHNIQUES

(71) Applicant: Juniper Networks, Inc., Sunnyvale, CA (US)

(72) Inventors: Vyasraj Satyanarayana, Bangalore (IN); Prashanth Chandra, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 14 days.

(21) Appl. No.: 15/641,784

(22) Filed: Jul. 5, 2017

(51) Int. Cl.
 *H04L 12/801* (2013.01)
 *H04L 12/707* (2013.01)
 *G06N 99/00* (2010.01)

(52) U.S. Cl.
 CPC ......... *H04L 47/127* (2013.01); *G06N 99/005* (2013.01); *H04L 45/24* (2013.01)

(58) Field of Classification Search
 CPC ...... H04L 47/127; H04L 45/24; G06N 99/005
 See application file for complete search history.

(56) References Cited

U.S. PATENT DOCUMENTS

| | | | | |
|---|---|---|---|---|
| 9,985,906 B2 * | 5/2018 | Reddy | ............... | H04W 24/08 |
| 2008/0144511 A1 * | 6/2008 | Marcondes | ............. | H04L 45/00 370/236 |
| 2012/0147744 A1 * | 6/2012 | Lee | .................. | H04L 47/20 370/230 |
| 2012/0250570 A1 * | 10/2012 | Parker | ............... | H04L 43/0882 370/253 |

* cited by examiner

*Primary Examiner* — Lakeram Jangbahadur
(74) *Attorney, Agent, or Firm* — Harrity & Harrity, LLP

(57) ABSTRACT

A device may receive, from a set of network devices, telemetry information associated with a first set of flows. The device may process, using a machine learning technique, the telemetry information to determine information that permits the set of network devices to identify a set of expected bandwidth values associated with a second set of flows. The device may provide, to a network device of the set of network devices, at least a portion of the information, that permits the set of network devices to identify the set of expected bandwidth values associated with the second set of flows, to permit the network device to determine an expected bandwidth value associated with a flow of the second set of flows and select a link to use when providing network traffic associated with the flow based on the expected bandwidth value.

20 Claims, 11 Drawing Sheets

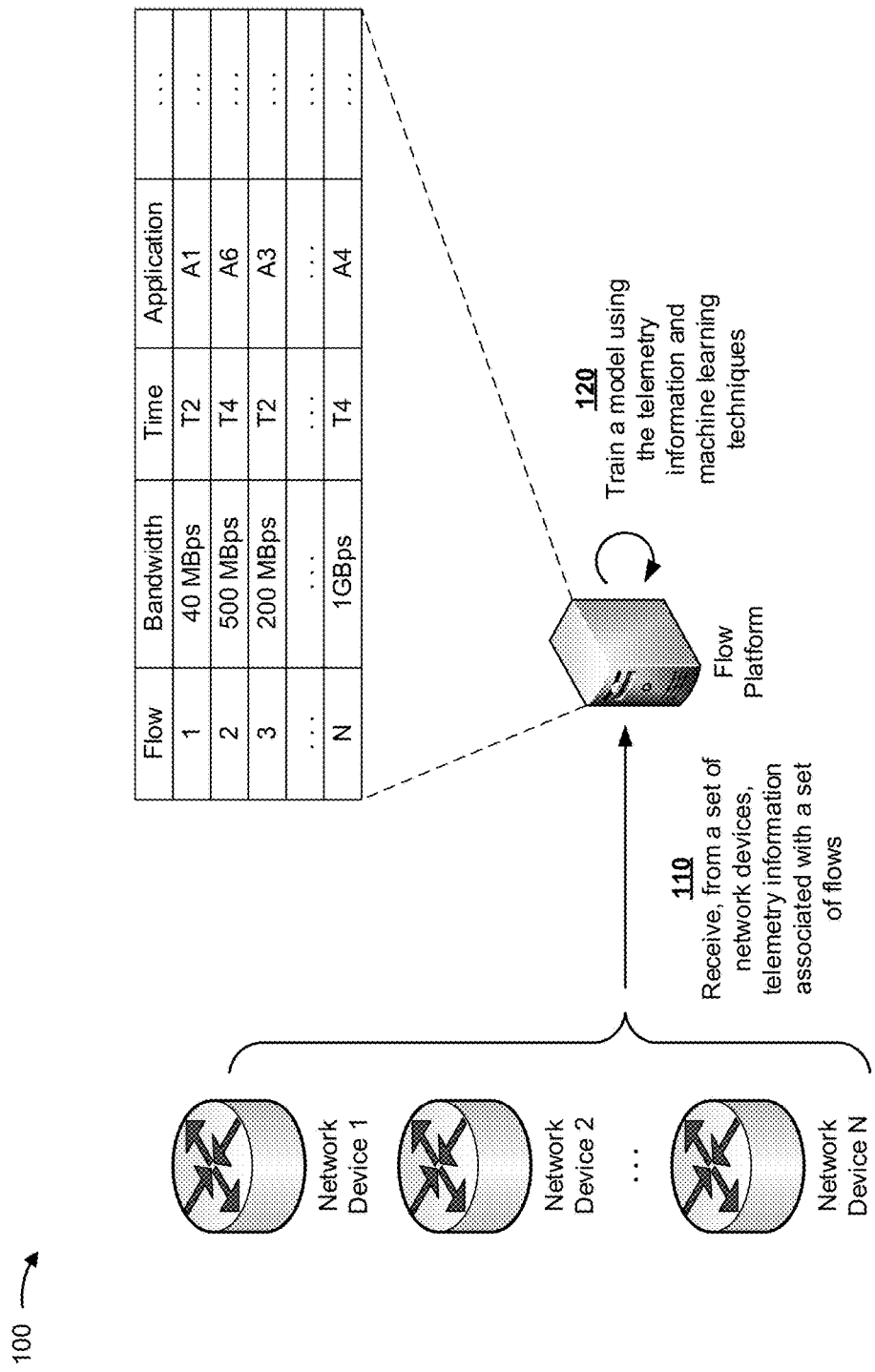

FLOW DISTRIBUTION USING TELEMETRY AND MACHINE LEARNING TECHNIQUES

BACKGROUND

Telemetry may refer to an automated communications process by which measurements and other data are collected at remote or inaccessible points and are transmitted to receiving equipment for monitoring and other purposes.

SUMMARY

According to some possible implementations, a network device may include one or more processors to receive information that permits the network device to identify a set of expected bandwidth values associated with a first set of flows. The information that permits the network device to identify the set of expected bandwidth values might have been generated using a machine learning technique on telemetry information, associated with a second set of flows, from a set of network devices. The one or more processors may receive network traffic associated with a flow of the first set of flows. The one or more processors may identify an expected bandwidth value, of the set of expected bandwidth values, associated with the flow using the information that permits the network device to identify the set of expected bandwidth values. The one or more processors may select a link, of a set of links, to use when providing the network traffic associated with the flow based on the expected bandwidth value associated with the flow. The one or more processors may provide the network traffic on the link.

According to some possible implementations, a system may include one or more devices to receive telemetry information associated with a first set of flows. The one or more devices may process, using a machine learning technique, the telemetry information to determine information that permits the one or more devices to identify a set of expected bandwidth values associated with a second set of flows. The one or more devices may receive network traffic associated with a flow of the second set of flows. The one or more devices may identify an expected bandwidth value, of the set of expected bandwidth values, associated with the flow using the information that permits the one or more devices to identify the set of expected bandwidth values. The one or more devices may select a link, of a set of links, to use when providing the network traffic associated with the flow based on the expected bandwidth value associated with the flow. The one or more devices may provide the network traffic on the link.

According to some possible implementations, a method may include receiving, by a device and from a set of network devices, telemetry information associated with a first set of flows. The method may include processing, by the device and using a machine learning technique, the telemetry information to determine information that permits the set of network devices to identify a set of expected bandwidth values associated with a second set of flows. The method may include providing, by the device and to a network device of the set of network devices, at least a portion of the information, that permits the set of network devices to identify the set of expected bandwidth values associated with the second set of flows, to permit the network device to determine an expected bandwidth value, of the set of expected bandwidth values, associated with a flow of the second set of flows and select a link, of a set of links, to use when providing network traffic associated with the flow based on the expected bandwidth value.

BRIEF DESCRIPTION OF THE DRAWINGS

FIGS. 1A-1F are diagrams of an overview of an example implementation described herein;

DETAILED DESCRIPTION

Figure 1B:
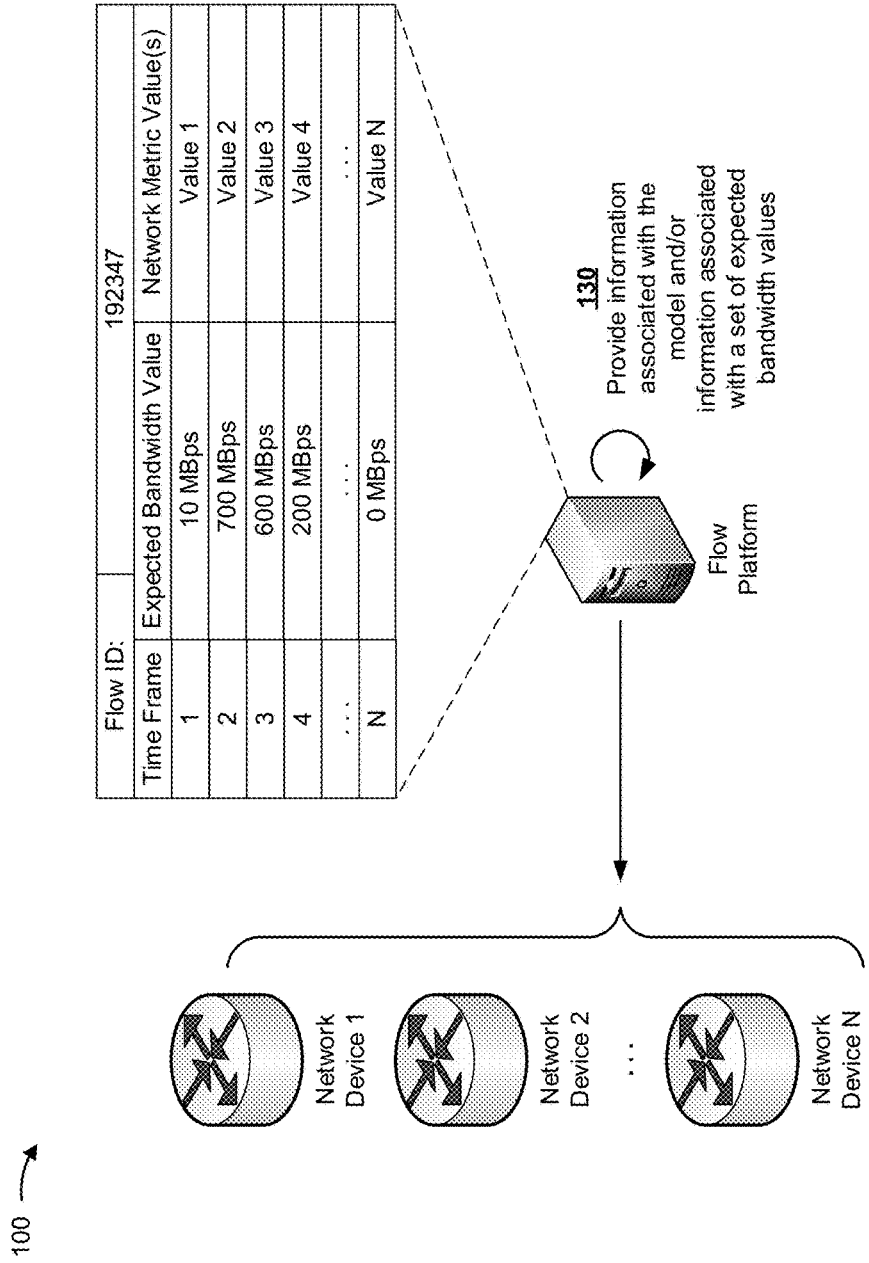

The following detailed description of example implementations refers to the accompanying drawings. The same reference numbers in different drawings may identify the same or similar elements.

A network device (e.g., a router, a switch, a firewall, etc.) may provide network traffic associated with a flow (e.g., a sequence of packets that share some common characteristics) to another network device via a particular link. For example, the network device may receive a packet and implement a hashing technique using information associated with the packet (e.g., five-tuple information, such as a source address, a destination address, a source port identifier, a destination port identifier, and/or a protocol identifier). Additionally, the network device may identify a link, via which to provide the network traffic, based on a result of the hashing technique.

In this way, the network device may distribute flows via various links, such as in situations where a set of links is associated with a link aggregation group (LAG), in situations where the set of links is associated with various paths to a destination address associated with the packet (e.g., multiple "best paths" in an equal-cost multi-path (ECMP) scenario), or the like.

However, distribution of flows across links using such techniques may result in over-utilization or under-utilization of particular links. For example, the network device may distribute, to a single link, multiple flows that, when aggregated, consume more bandwidth than a bandwidth capacity of the single link. Thereby, communication issues, such as increased latency, packet loss, low throughput, increased jitter, increased delay, etc., may occur.

Additionally, the network device may distribute flows to another link that, when aggregated, consume less bandwidth than a bandwidth capacity of the link. Thereby, network resources are inefficiently used and/or communication issues with other links may be exacerbated. In other words, selecting a link based on packet information and/or without identifying a bandwidth value of a flow may increase a number of scenarios associated with under-utilization and/or over-utilization of a link.

Some implementations described herein provide a set of network devices to provide, to a flow platform, telemetry information associated with flows. For example, the telemetry information may include information that identifies a flow, a time frame (e.g., a time of day, a day of the week, a start time of a flow, an end time of a flow, a duration of a flow, etc.), a bandwidth value, a throughput value, a delay value, a jitter value, a latency value, a burstiness value, an application associated with the flow, or the like.

Some implementations described herein provide a flow platform that aggregates telemetry information associated with flows. As an example, the flow platform may receive, from network devices, millions, billions, trillions, etc. of data points associated with thousands, millions, billions, etc. of flows. The flow platform may implement machine learning techniques and/or big data processing techniques to train a model and/or determine, using the telemetry information, expected bandwidth values associated with the flows (e.g., may use artificial networks, Bayesian statistics, learning automata, Hidden Markov Modeling, linear classifiers, quadratic classifiers, decision trees, clusters, association rule learning, or the like). For example, an expected bandwidth value may refer to a bandwidth value that a particular flow is likely to exhibit, to require, to consume, etc. for a particular time frame (e.g., a time of day, a day of the week, a month, a season, etc.).

Some implementations described herein provide a network device to receive a model from the flow platform, and use the model to determine expected bandwidth values of flows. Some implementations described herein provide a network device to receive, from the flow platform, information that identifies expected bandwidth values of flows and store, in a data structure, the information that identifies the expected bandwidth values. In this way, the network device may receive network traffic associated with a flow, identify the flow (e.g., based on packet information), and identify an expected bandwidth value of the flow (e.g., based on an output of a model and/or based on stored information).

Some implementations described herein provide a network device that determines current link bandwidth values of a set of links, such as an amount of bandwidth that the links are accommodating. Additionally, in some implementations described herein, the network device may select a particular link, of the set of links, to provide the network traffic associated with the flow using the expected bandwidth value of the flow and the current link bandwidth value of the particular link. For example, the network device may determine whether the particular link is capable of accommodating network traffic associated with the flow (e.g., whether an available bandwidth value of the particular link is greater than the expected bandwidth value).

In this way, the network device may prevent particular links from being over-utilized and/or under-utilized, thereby reducing communication issues and more efficiently using network resources. In this way, some implementations described herein conserve processor and/or memory resources of network devices and/or conserve network resources.

FIGS. 1A-1F are diagrams of an overview of an example implementation 100 described herein. As shown in FIG. 1A, and by reference number 110, a flow platform may receive, from a set of network devices, telemetry information associated with a set of flows. For example, network devices may provide telemetry information associated with thousands, millions, billions, etc. of flows. In some implementations, the telemetry information may include information that identifies a flow, a bandwidth value of the flow, a time frame associated with the flow (e.g., a time of day, a day of the week, a week of the month, etc.), an application associated with the flow, or the like.

As further shown in FIG. 1A, and by reference number 120, the flow platform may train a model using the telemetry information and machine learning techniques. For example, the flow platform may analyze the telemetry information, and train a model based on the telemetry information and known bandwidth values of the flows.

As shown in FIG. 1B, and by reference number 130, the flow platform may provide information associated with the model and/or information associated with a set of expected bandwidth values. For example, the flow platform may provide a model that a network device may use to determine an expected bandwidth value of a flow. Alternatively, the flow platform may provide information that identifies expected bandwidth values of flows, such that the network devices may store the expected bandwidth values of the flows.

As an example, and as shown, the flow platform may determine a set of expected bandwidth values of a flow for a set of time frames. In other words, a flow may be associated with different expected bandwidth values for different times of the day, different days of the week, etc. In this way, a network device may utilize the expected bandwidth values when selecting a link to use to provide network traffic associated with a flow, as described elsewhere herein.

As further shown in FIG. 1B, the flow platform may provide information associated with other network metric values. For example, the other network metric values may include latency values, jitter values, burstiness value, delay values, or the like. Additionally, or alternatively, the flow platform may provide a set of models that permit the network device to determine one or more of the network metric values.

While FIG. 1B shows expected bandwidth values associated with a single flow, it should be understood that, in practice, the flow platform may determine expected bandwidth values associated with thousands, millions, billions, etc. of flows.

Figure 1C:
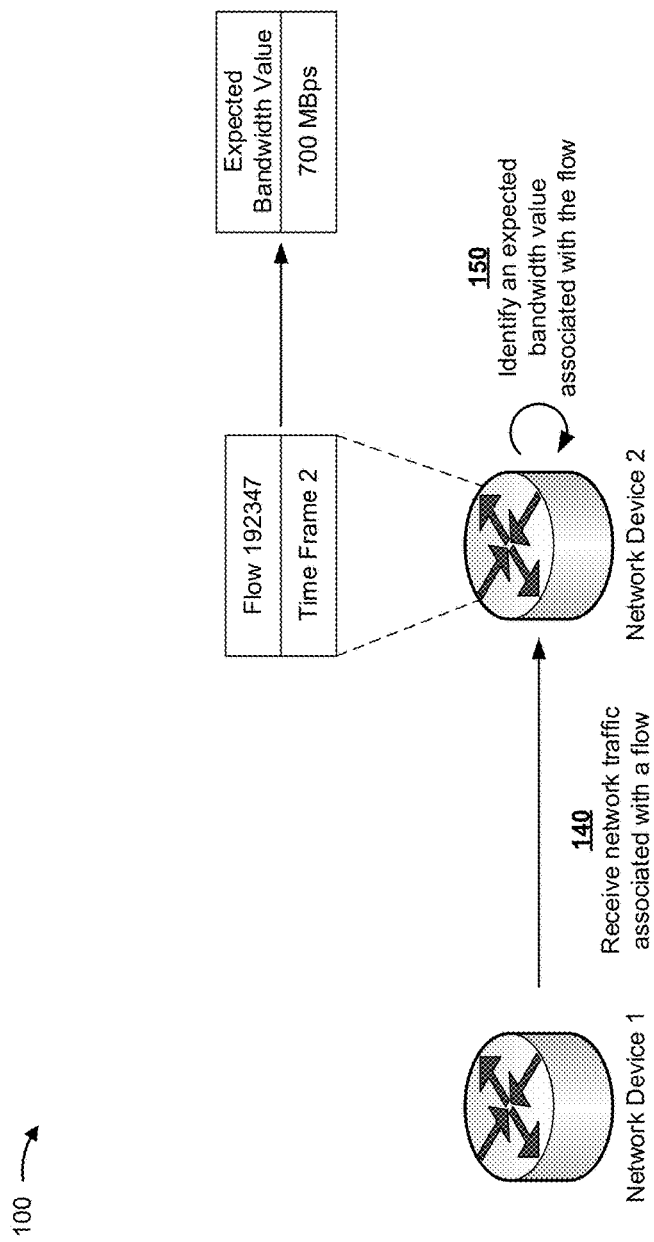

As shown in FIG. 1C, and by reference number 140, network device 2 may receive network traffic associated with a flow. For example, network device 2 may receive, from network device 1, a packet associated with a flow. In some implementations, network device 2 may process the packet associated with the flow, and determine information that identifies the flow (e.g., five-tuple information, or other information associated with the packet).

As further shown in FIG. 1C, and by reference number 150, network device 2 may identify an expected bandwidth value associated with the flow. In some implementations, network device 2 may determine an expected bandwidth value associated with the flow using a model. For example, network device 2 may input parameters associated with the flow into the model (e.g., a time of day, a day of the week, five-tuple information, a flow identifier, an application identifier of an application associated with the flow, an application type of an application associated with the flow, or the like), and determine an expected bandwidth value of the flow based on an output of the model. Alternatively, network device 2 may search a data structure, using a flow identifier and information that identifies a current time frame, to identify the expected bandwidth value.

As shown, and as an example, the expected bandwidth value of 700 Megabytes per second (MBps) may identify that network device 2 might be required, may need, etc. to provide network traffic associated with the flow at a rate of at least 700 MBps in order to prevent, reduce, etc. communication issues (e.g., packet loss, increased latency, reduced throughput, etc.). In this way, network device 2 may use the expected bandwidth value of the flow when selecting a link via which to provide the network traffic associated with the flow, as described below.

Figure 1D:
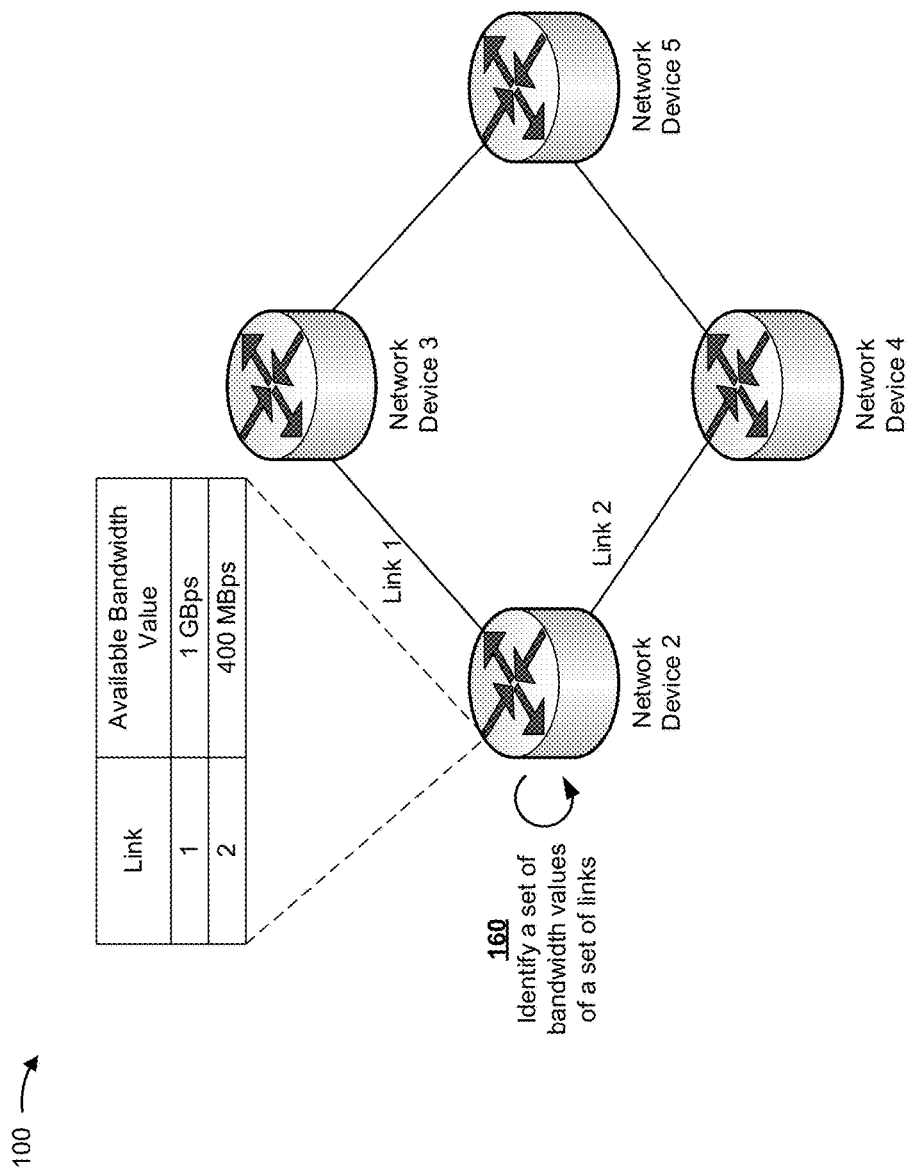

As shown in FIG. 1D, and by reference number 160, network device 2 may identify a set of bandwidth values of a set of links. For example, network device 2 may identify available bandwidth values of a set of links that may be used to provide network traffic, associated with the flow, toward an endpoint device. As an example, assume that network device 2 determines that the network traffic associated with the flow is to be provided to network device 5. In this case, and continuing with the example, network device 2 may determine that the network traffic may be provided via link 1 or link 2.

Network device 2 may identify a current bandwidth usage value, an available bandwidth value, a bandwidth capacity value, or the like, of link 1 and link 2 respectively. In this way, network device 2 may compare an available bandwidth value of a link and the expected bandwidth value of the flow when selecting a particular link via which to provide the network traffic, as described below.

Figure 1E:
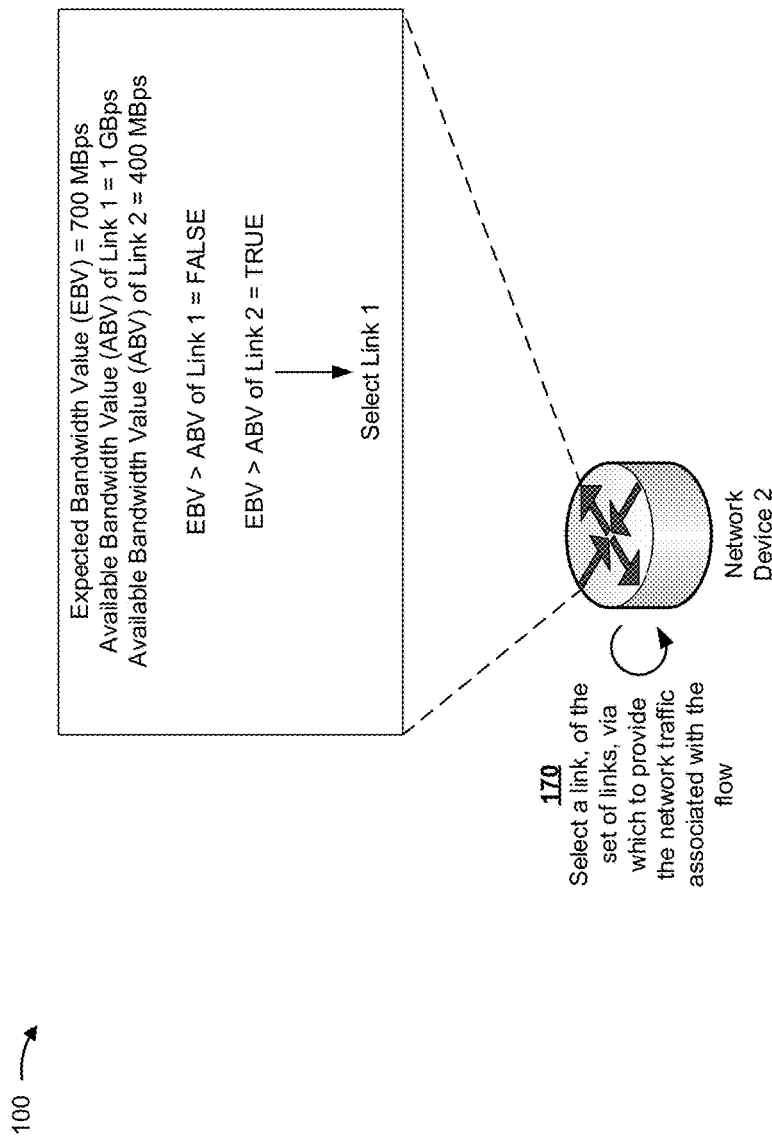

As shown in FIG. 1E, and as shown by reference number 170, network device 2 may select a link, of the set of links, via which to provide the network traffic associated with the flow. For example, the network device may compare the respective available bandwidth values of the links (i.e., link 1 and link 2) and the expected bandwidth value of the flow. In this case, network device 2 may select link 1 because link 1 includes an available bandwidth value that is greater than the expected bandwidth value (e.g., 1 gigabyte per second (GBps)>700 MBps). Further, network device 2 may determine that link 2 includes an available bandwidth value that is less than the expected bandwidth value (e.g., 400 MBps<700 MBps). In this way, network device 2 may select a link (i.e., link 1) that is more capable of accommodating an expected bandwidth requirement of the flow than as compared to another link (i.e., link 2).

Figure 1F:
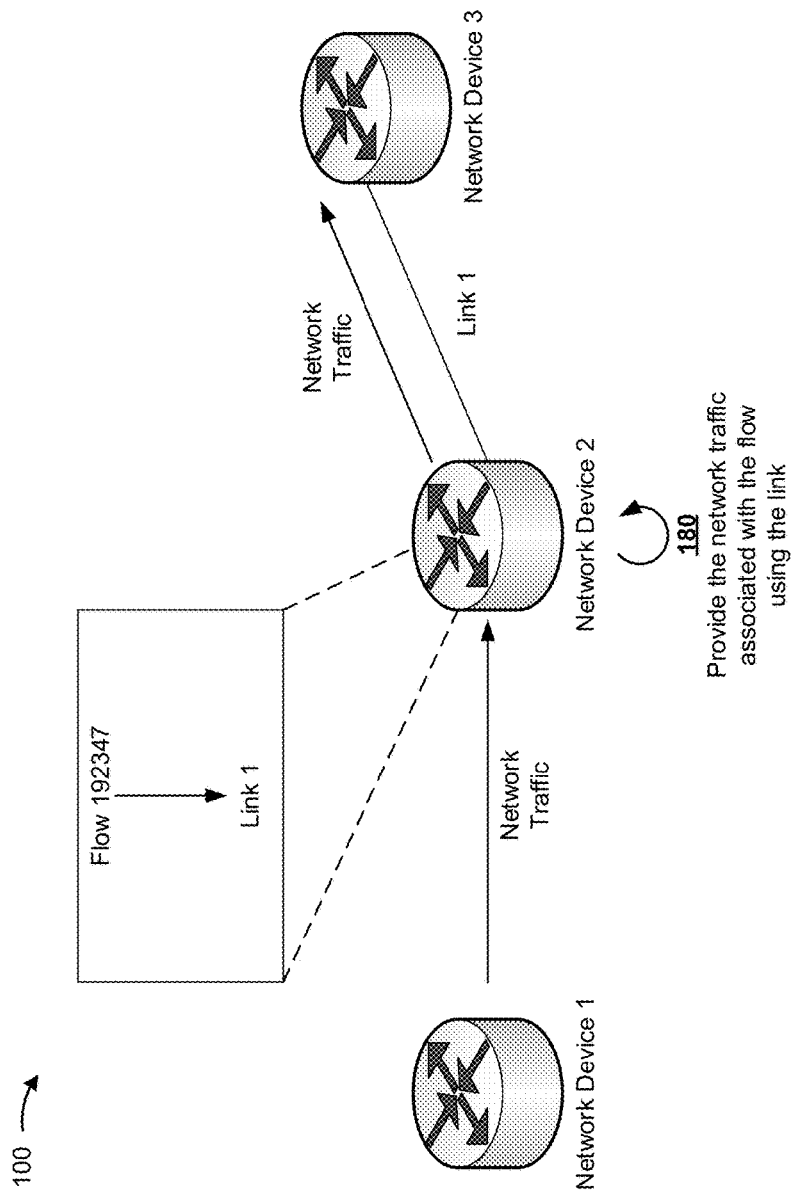

As shown in FIG. 1F, and by reference number 180, network device 2 may provide the network traffic associated with the flow using the link. In some implementations, network device 2 may store, in a data structure, information that identifies that network traffic associated with the flow is to be provided via link 1. For example, network device 2 may receive, from network device 1, network traffic associated with the flow and provide, to network device 3 via link 1, the network traffic associated with the flow.

In some implementations, network device 2 may monitor a bandwidth value of the flow, and determine whether link 1 is capable of accommodating network traffic associated with the flow. Additionally, network device 2 may provide, to the flow platform, additional telemetry information based on providing the network traffic associated with the flow.

In this way, a network device may select a link that is likely to be able to accommodate network traffic associated with a flow and/or is more capable of accommodating network traffic associated with a flow than as compared to other available links. In this way, some implementations described herein reduce communication issues, such as high latency, packet loss, reduced throughput, etc. Additionally, by more evenly distributing flows across links (e.g., as compared to situations where flows are distributed based on packet information), some implementations described herein more efficiently utilize network resources.

As indicated above, FIGS. 1A-1F are provided merely as an example. Other examples are possible and may differ from what was described with regard to FIGS. 1A-1F.

Figure 2:
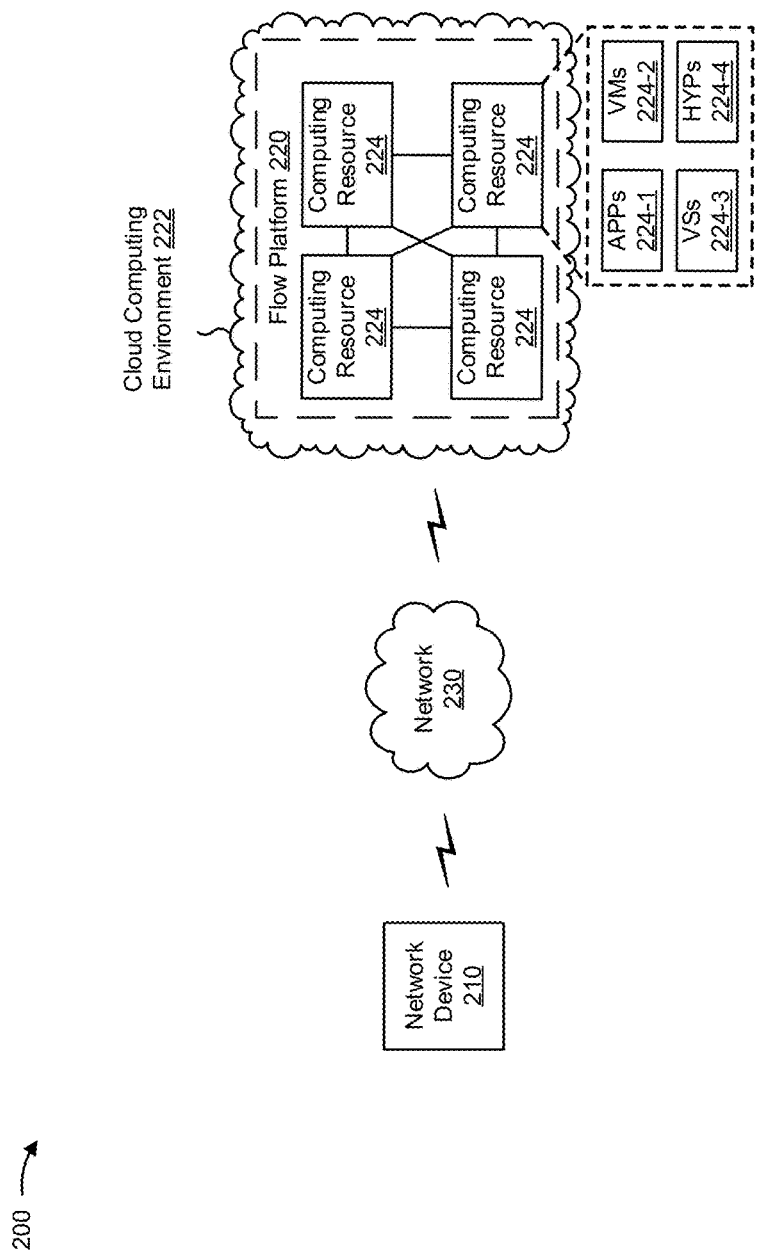
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a network device 210, a flow platform 220, and a network 230. Devices of environment 200 may interconnect via wired connections, wireless connections, or a combination of wired and wireless connections.

Network device 210 includes one or more devices capable of processing and transferring network traffic (e.g., packets). For example, network device 210 may include a router, a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device. In some implementations, network device 210 may be a physical device implemented within a housing, such as a chassis. In some implementations, network device 210 may be a virtual device implemented by one or more computer devices of a cloud computing environment or a data center.

As used herein, a packet may refer to a communication structure for communicating information, such as a protocol data unit (PDU), a network packet, a datagram, a segment, a block, a cell, a frame, a subframe, a slot, a symbol, a portion of any of the above, and/or another type of formatted or unformatted unit of data capable of being transmitted via a network.

As used herein, a flow may refer to a sequence of packets that share common information, such as five-tuple information (e.g., a source address, a destination address, a source port identifier, a destination port identifier, and/or a protocol identifier).

Flow platform 220 includes one or more devices capable of receiving, from network devices 210, telemetry information associated with a set of flows, and determining expected bandwidth values of the set of flows using the telemetry information and machine learning techniques. In some implementations, flow platform 220 may be designed to be modular such that certain software components may be swapped in or out depending on a particular need. As such, flow platform 220 may be easily and/or quickly reconfigured for different uses.

In some implementations, as shown, flow platform 220 may be hosted in cloud computing environment 222. Notably, while implementations described herein describe flow platform 220 as being hosted in cloud computing environment 222, in some implementations, flow platform 220 might not be cloud-based (i.e., may be implemented outside of a cloud computing environment) or may be partially cloud-based.

Cloud computing environment 222 includes an environment that hosts flow platform 220. Cloud computing environment 222 may provide computation, software, data access, storage, etc. services that do not require end-user (e.g., network device 210) knowledge of a physical location and configuration of system(s) and/or device(s) that hosts flow platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host flow platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by network device 210. Application 224-1 may eliminate a need to install and execute the software applications on network devices 210. For example, application 224-1 may include software associated with flow platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., telemetry device 205), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, an Ethernet virtual private network (EVPN), or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
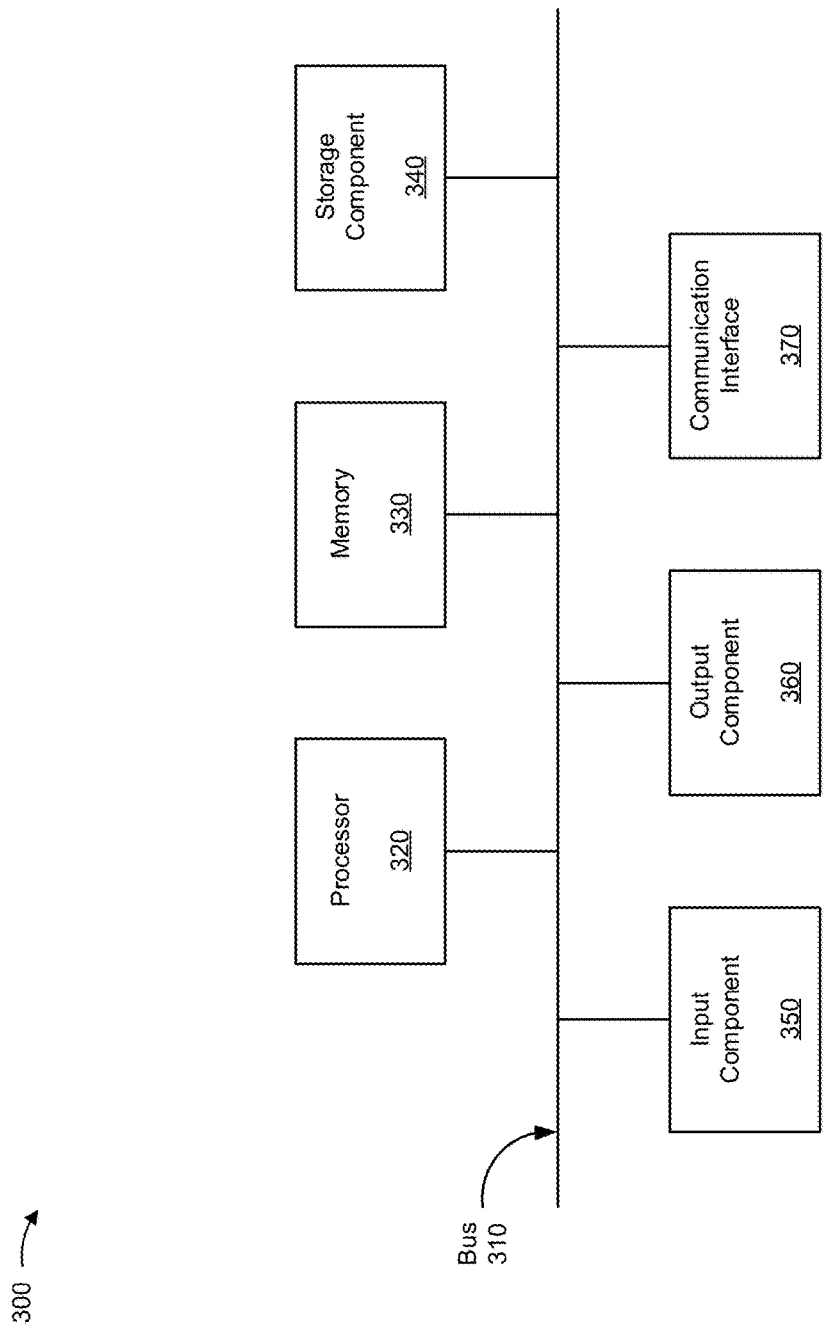
FIG. 3 is a diagram of example components of one or more devices of FIG. 2.

FIG. 3 is a diagram of example components of a device 300. Device 300 may correspond to flow platform 220. In some implementations, flow platform 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
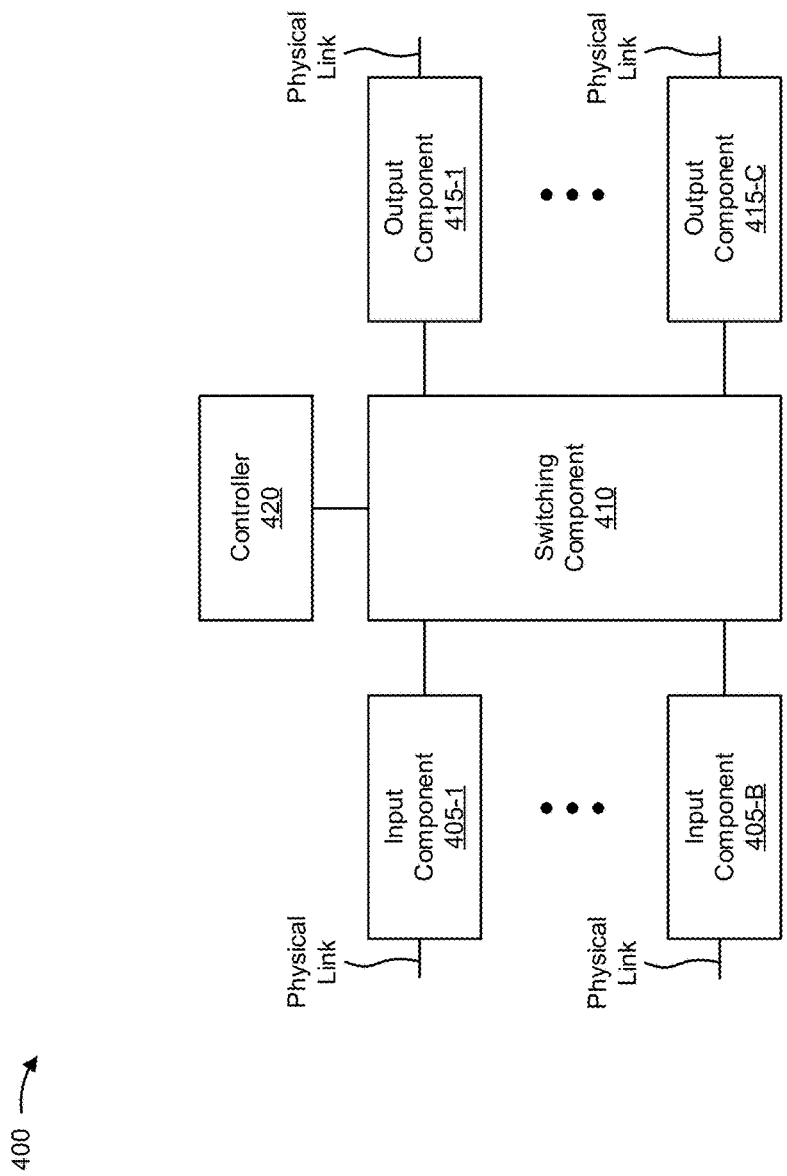
FIG. 4 is a diagram of example components of one or more devices of FIG. 2.

FIG. 4 is a diagram of example components of a device 400. Device 400 may correspond to network device 210. In some implementations, network device 210 may include one or more devices 400 and/or one or more components of device 400. In some implementations, device 400 may be implemented as a virtual device that is implemented within a cloud computing environment, such as implemented as a virtual machine that executes on one or more cloud computer devices (e.g., servers) in the cloud computing environment.

As shown in FIG. 4, device 400 may include one or more input components 405-1 through 405-B (B≥1) (hereinafter referred to collectively as input components 405, and individually as input component 405), a switching component 410, one or more output components 415-1 through 415-C (C≥1) (hereinafter referred to collectively as output components 415, and individually as output component 415), and a controller 420.

Input component 405 may be points of attachment for physical links and may be points of entry for incoming traffic, such as packets. Input component 405 may process incoming traffic, such as by performing data link layer encapsulation or decapsulation. In some implementations, input component 405 may send and/or receive packets. In some implementations, input component 405 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 405.

Switching component 410 may interconnect input components 405 with output components 415. In some implementations, switching component 410 may be implemented via one or more crossbars, via busses, and/or with shared memories. The shared memories may act as temporary buffers to store packets from input components 405 before the packets are eventually scheduled for delivery to output components 415. In some implementations, switching component 410 may enable input components 405, output components 415, and/or controller 420 to communicate.

Output component 415 may store packets and may schedule packets for transmission on output physical links. Output component 415 may support data link layer encapsulation or decapsulation, and/or a variety of higher-level protocols. In some implementations, output component 415 may send packets and/or receive packets. In some implementations, output component 415 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 415. In some implementations, input component 405 and output component 415 may be implemented by the same set of components (e.g., and input/output component may be a combination of input component 405 and output component 415).

Controller 420 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor is implemented in hardware, firmware, or a combination of hardware and software. In some implementations, controller 420 may include one or more processors that may be programmed to perform a function.

In some implementations, controller 420 may include a random access memory (RAM), a read only memory (ROM), and/or another type of dynamic or static storage device (e.g., a flash memory, a magnetic memory, an optical memory, etc.) that stores information and/or instructions for use by controller 420.

In some implementations, controller 420 may communicate with other devices, networks, and/or systems connected to device 400 to exchange information regarding network topology. Controller 420 may create routing tables based on the network topology information, create forwarding tables based on the routing tables, and forward the forwarding tables to input components 405 and/or output components 415. Input components 405 and/or output components 415 may use the forwarding tables to perform route lookups for incoming and/or outgoing packets.

Controller 420 may perform one or more processes described herein. Controller 420 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 420 from another computer-readable medium or from another device via a communication interface. When executed, software instructions stored in a memory and/or storage component associated with controller 420 may cause controller 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
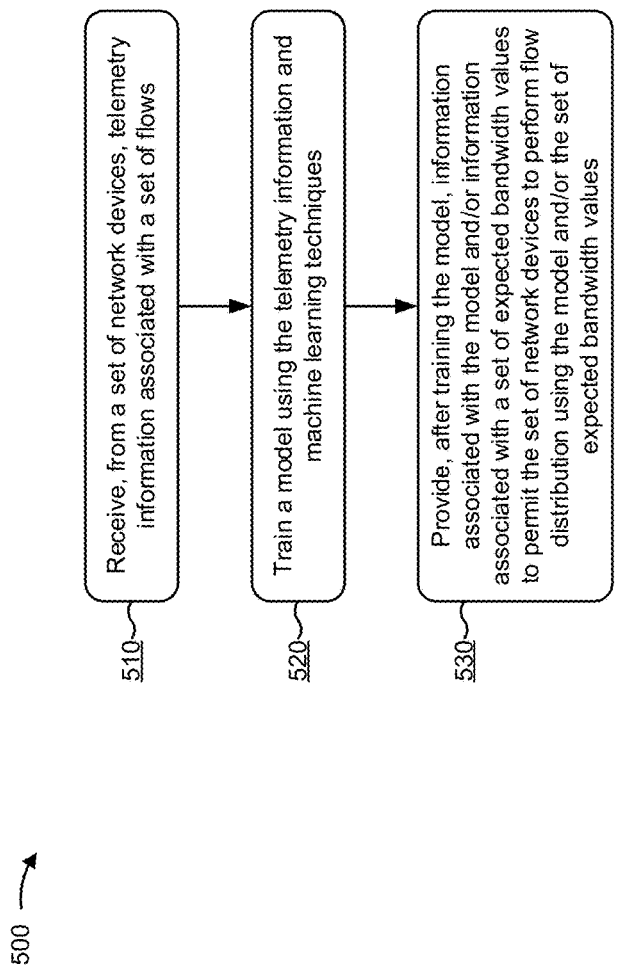
FIG. 5 is a flow chart of an example process of determining expected bandwidth values of flows using telemetry information and machine learning techniques.

FIG. 5 is a flow chart of an example process 500 for determining expected bandwidth values of flows using telemetry information and machine learning techniques. In some implementations, one or more process blocks of FIG. 5 may be performed by flow platform 220. In some implementations, one or more process blocks of FIG. 5 may be performed by another device or a group of devices separate from or including flow platform 220, such as network device 210.

As shown in FIG. 5, process 500 may include receiving, from a set of network devices, telemetry information associated with a set of flows (block 510). For example, flow platform 220 may receive, from a set of network devices 210, telemetry information associated with a set of flows to permit flow platform 220 to train a model and/or determine expected bandwidth values of the set of flows using the telemetry information and machine learning techniques.

In some implementations, network devices 210 may transfer network traffic associated with flows, and collect telemetry information based on transferring the network traffic associated with the flows. In some implementations, flow platform 220 may receive telemetry information from hundreds, thousands, millions, etc. of network devices 210. Additionally, flow platform 220 may receive millions, billions, trillions, etc. of data points of telemetry information associated with thousands, millions, billions, etc. of flows. As such, flow platform 220 may use a big data technique to process the telemetry information, as such a large volume of data cannot be processed objectively by a human operator.

In some implementations, telemetry information may include a flow identifier of a flow, five-tuple information associated with a flow, or the like. Additionally, or alternatively, telemetry information may include temporal information, such as information that identifies a date and time, a start time of a flow, a time of day, a day of the week, a season, or the like. Additionally, or alternatively, telemetry information may include a network metric value of a flow, such as a bandwidth value (e.g., an actual bandwidth value), a throughput value, a latency value, a jitter value, a delay value, a burstiness value, a time frame at which bursts occur, or the like (e.g., a maximum value, a minimum value, an average value, a variation in values, or the like).

In some implementations, telemetry information may include a packet count value, a byte count value, a packet loss value, or the like. Additionally, or alternatively, telemetry information may include a protocol identifier, such as an identifier of a physical layer protocol, a data link layer protocol, a network layer protocol, a transport layer protocol, a session layer protocol, a presentation layer protocol, an application layer protocol, or the like. Additionally, or alternatively, telemetry information may include information that identifies an application or a type of application associated with a flow, such as a multimedia application, an email application, a peer-to-peer application, a remote-access application, a social-networking application, a web application, a gaming application, a messaging application, or the like.

In some implementations, network device 210 may provide, to flow platform 220, telemetry information based on a time frame (e.g., every hour, every day, every week, etc.), based on a termination of a flow, based on a request from flow platform 220, or the like. Additionally, or alternatively, flow platform 220 may receive telemetry information from data logs, from a file provided by an operator, or the like.

In some implementations, network device 210 may provide, to flow platform 220, telemetry information associated with each flow that is processed by network device 210. Alternatively, network device 210 may provide, to flow platform 220, telemetry information associated with a subset of flows that network device 210 has processed. For example, network device 210 may provide telemetry information corresponding to flows that include bandwidth values that satisfy a threshold, flows that include durations that satisfy a threshold, or the like. In this way, flow platform 220 may receive telemetry information associated with flows that are more likely to consume network resources than as compared to other flows that include smaller bandwidth values, include shorter durations, or the like. In this way, flow platform 220 may refrain from determining expected bandwidth values of flows that are less likely to consume network resources, thereby conserving processor and/or memory resources of flow platform 220.

In this way, flow platform 220 may receive millions, billions, trillions, etc. of data points associated with thousands, millions, billions, etc. of flows. Additionally, in this way, flow platform 220 may train a model using the telemetry information and machine learning techniques, as described below. By utilizing such a large quantity of information to train a model, flow platform 220 may increase the accuracy of the trained model, such that network devices 210 may more accurately determine expected bandwidth values of flows using the model, and may distribute flows across links in a more efficient manner.

As further shown in FIG. 5, process 500 may include training a model using the telemetry information and machine learning techniques (block 520). For example, flow platform 220 may train a model using the telemetry information and machine learning techniques to determine expected bandwidth values of the set of flows and/or permit network devices 210 to determine expected bandwidth values of the set of flows using the model.

In some implementations, an expected bandwidth value may refer to information that identifies an expected bandwidth value, a predicted bandwidth value, an anticipated bandwidth value, etc. associated with a flow. In other words, an expected bandwidth value may refer to an amount of bandwidth that the flow is likely to require, consume, exhibit, etc. based on historical data associated with the flow.

In some implementations, flow platform 220 may determine an expected bandwidth value for a flow based on a model. In some implementations, flow platform 220 may use machine learning techniques to analyze data (e.g., training data, such as telemetry information, etc.) and train models. The machine learning techniques may include, for example, supervised and/or unsupervised techniques, such as artificial networks, Bayesian statistics, learning automata, Hidden Markov Modeling, linear classifiers, quadratic classifiers, decision trees, clusters, association rule learning, or the like. In some implementations, flow platform 220 may use another kind of computer-implemented technique, such as artificial intelligence, machine perception, or computer vision, to analyze telemetry information and determine expected bandwidth values of flows.

In some implementations, flow platform 220 may receive information that identifies telemetry information, and information associated with known bandwidth values of the flows. Additionally, flow platform 220 may train a model based on the telemetry information and the known bandwidth values. In some implementations, flow platform 220 may train the model using millions, billions, trillions, etc. of data points. As such, flow platform 220 may use a big data technique to train the model.

Due to the potentially large volume of data used to train the model, offloading the training of the model and/or the determining of expected bandwidth values, from network device 210 to flow platform 220, may improve operation of network device 210, may reduce utilization of processor and memory resources of network device 210, or the like.

In some implementations, flow platform 220 may train a model using telemetry information associated with a first set of flows, and provide the model to network devices 210. Additionally, network devices 210 may determine expected bandwidth values of a second set of flows using the model that was trained using telemetry information associated with the first set of flows. In some implementations, the first set of flows may be different than the second set of flows. For example, the first set of flows may include some, or none, of the same flows as the second set of flows.

In this way, flow platform 220 may train a model (or a set of models) using telemetry information received from hundreds, thousands, millions, etc. of network devices 210. By utilizing such a large amount of training data, flow platform 220 may train models that are more accurate than as compared to situations where less training data is utilized. In this way, flow platform 220 and/or network device 210 may determine expected bandwidth values of a flow using a model, as described below.

As further shown in FIG. 5, process 500 may include providing, after training the model, information associated with the model and/or information associated with a set of expected bandwidth values to permit the set of network devices to perform flow distribution using the model and/or the set of expected bandwidth values (block 530). For example, flow platform 220 may provide, to a set of network devices 210, the model for use by the set of network devices 210 and/or may provide expected bandwidth values that were determined using the model.

In some implementations, flow platform 220 may provide the model for use by network device 210, such that network device 210 may determine an expected bandwidth value of a flow based on an input set of parameter values (e.g., a time of day, a date, a day of the week, an application associated with the flow, etc.). In some implementations, flow platform 220 may provide, to network device 210, a model based on a time frame, based on a request from network device 210, based on updating a model, or the like.

In some implementations, network device 210 may receive, from flow platform 220, information that identifies an expected bandwidth value of a flow, thereby reducing a need of network device 210 to determine the expected bandwidth value using a model. For example, flow platform 220 may provide information that identifies a flow (e.g., a flow identifier) and an expected bandwidth value of the flow. In some implementations, flow platform 220 may provide, to network device 210, information that identifies expected bandwidth values of thousands, millions, billions, etc. of flows.

In some implementations, flow platform 220 may provide information that identifies a set of expected bandwidth values, of a flow, that correspond to different time frames (e.g., a time of day, a day of the week, a week of the month, a month, a season, etc.). As an example, a flow may exhibit different behavior based on a time frame. In other words, a flow may consume more or less bandwidth based on a particular time frame. As an example, a flow may be associated with 400 MBps at a first time of day, and may be associated with 50 MBps at a second time of the day.

In some implementations, flow platform 220 may provide information that identifies expected bandwidth values of particular flows. For example, network device 210 may provide, to flow platform 220, information that identifies particular flows that are processed by network device 210 (e.g., the top hundred most frequently processed flows, the top thousand most frequently processed flows, a subset of processed flows, etc.), and may receive, from flow platform 220, expected bandwidth values of the particular flows. In this way, network device 210 may store information associated with particular flows that network device 210 is more likely to process than as compared to other flows, thereby conserving processor and/or memory resources of network device 210.

In some implementations, flow platform 220 may provide information that identifies expected bandwidth values associated with flows that include expected bandwidth values that satisfy a threshold bandwidth value. For example, flow platform 220 may provide information, associated with particular flows, that include expected bandwidth values that are greater than a particular bandwidth value (e.g., 400 MBps, 500 MBps, 1 GBps, or the like). In this way, network device 210 may store information that identifies expected bandwidth values of flows that are more likely to include greater bandwidth values (e.g., more likely to consume bandwidth) than as compared to other flows that are less likely to consume a large quantity of bandwidth. Additionally, in this way, network device 210 may prevent storage of information associated with the flows that are less likely to consume a large amount of bandwidth, thereby conserving processor and/or memory resources of network device 210. In other words, flow platform 220 may provide a portion of the information that identifies expected bandwidth values of flows.

In this way, network devices 210 may receive a model to use to determine expected bandwidth values of flows, and/or may receive information that identifies expected bandwidth values of flows. In either case, network devices 210 may more efficiently distribute flows across links using expected bandwidth values of the flows, as described in more detail in connection with FIG. 6. In this way, some implementations described herein reduce communication issues, and/or conserve network resources by reducing a number of situations where links are over-utilized or under-utilized.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
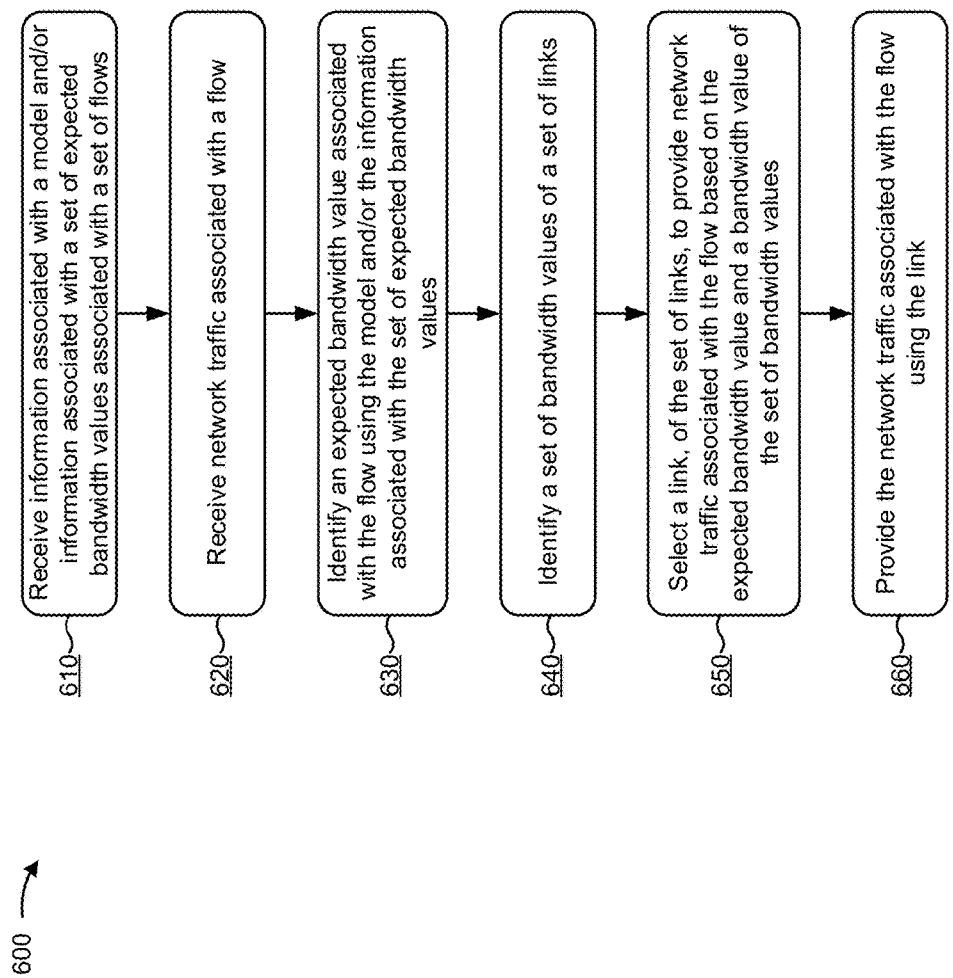
FIG. 6 is a flow chart of an example process for performing flow distribution using expected bandwidth values of flows.

FIG. 6 is a flow chart of an example process 600 for performing flow distribution using expected bandwidth values of flows. In some implementations, one or more process blocks of FIG. 6 may be performed by network device 210.

In some implementations, one or more process blocks of FIG. 6 may be performed by another device or a group of devices separate from or including network device 210, such as flow platform 220.

As shown in FIG. 6, process 600 may include receiving information associated with a model and/or information associated with a set of expected bandwidth values associated with a set of flows (block 610). For example, network device 210 may receive, from flow platform 220, a model and/or information associated with expected bandwidth values of flows in a similar manner as described above in connection with block 530 of FIG. 5. In some implementations, network device 210 may receive the model, and store the model for use when determining expected bandwidth values.

In some implementations, network device 210 may receive information that identifies a set of expected bandwidth values, and store the expected bandwidth values in a data structure. In some implementations, different modules (e.g., modules implemented in hardware, firmware, or software executing on hardware) of network device 210 may store the information that identifies the set of expected bandwidth values.

Additionally, or alternatively, different cards of network device 210 may store the information that identifies the set of expected bandwidth values (e.g., network device 210 may include a set of common form-factor module (CFM) cards, such as a services processing card (SPC), a network processing card (NPC), or the like). In some implementations, the different cards may perform different functions and/or include different memory resources. For example, the SPC may include fewer memory resources than as compared to an NPC. As such, the SPC may store a subset of expected bandwidth values, such as expected bandwidth values associated with flows that are most frequently processed by the SPC, flows that include the greatest expected bandwidth values, or the like. In this way, the SPC may conserve memory resources by storing information associated with a subset of flows (e.g., flows that are likely to be processed by the SPC, flows that are likely to consume a large quantity of bandwidth, or the like).

In this way, network device 210 may store the model to use to determine expected bandwidth values of flows and/or may store the expected bandwidth values of the flows. In either case, network device 210 may use the expected bandwidth values of the flows when distributing the flows across links, as described elsewhere herein.

As further shown in FIG. 6, process 600 may include receiving network traffic associated with a flow (block 620). For example, network device 210 may receive network traffic, associated with a flow, that is to be provided to another network device 210 via a link.

In some implementations, network device 210 may receive a packet, process the packet (e.g., a header, a payload, and/or a trailer), and identify information associated with the flow (e.g., five-tuple information, or other information associated with the flow and/or that identifies the flow). Additionally, network device 210 may determine a flow identifier based on the information associated with the flow.

In some implementations, such as in situations where the packet is the first packet of the flow, network device 210 may store, in a data structure (e.g., a flow table, a forwarding table, or the like), an entry that identifies the flow and that includes information associated with the flow. For example, the entry may be used to store telemetry information, such as telemetry information as described above in connection with block 510 of FIG. 5.

In this way, network device 210 may receive network traffic associated with a flow, and determine an expected bandwidth value of the flow to permit network device 210 to select a link, via which, to provide the network traffic, as described below.

As further shown in FIG. 6, process 600 may include identifying an expected bandwidth value associated with the flow using the model and/or the information associated with the set of expected bandwidth values (block 630). For example, network device 210 may identify an expected bandwidth value associated with the flow to permit network device 210 to more evenly distribute flows across links, as described in more detail elsewhere herein.

In some implementations, network device 210 may determine an expected bandwidth value of the flow using the model. For example, network device 210 may input a set of parameters associated with the flow (e.g., a time of day, a day of the week, a type of application, five-tuple information, etc.) into the model, and determine an expected bandwidth value of the flow based on an output of the model.

In some implementations, network device 210 may determine an expected bandwidth value of the flow using stored information. For example, network device 210 may search a data structure (e.g., perform a lookup in a flow table) using the flow identifier, and identify an expected bandwidth value for a particular time frame.

In some implementations, network device 210 may determine other network metric values associated with the flow using stored information and/or a model. For example, network device 210 may determine an expected latency value, an expected burstiness value, an expected time frame at which bursts occur, an expected throughput value, an expected delay value, or the like. In some implementations, network device 210 may use particular information (e.g., a particular network metric value, a set of network metric values, or the like) when selecting a link, as described below.

In this way, network device 210 may identify a set of bandwidth values of a set of links, and select a particular link via which to provide the network traffic associated with the flow based on the set of bandwidth values and the expected bandwidth value, as described below.

As further shown in FIG. 6, process 600 may include identifying a set of bandwidth values of a set of links (block 640). For example, network device 210 may identify a set of bandwidth values associated with a set of links that may be used to provide the network traffic to a destination device (e.g., associated with a destination address of the packet).

In some implementations, the set of links may be associated with a set of paths. For example, network device 210 may provide network traffic to a destination device using multiple paths of a set of paths (e.g., ECMP paths, or the like). Additionally, or alternatively, the set of links may be associated with a link aggregation group (LAG). For example, network device 210 may provide network traffic to an endpoint device via another network device 210, and may be connected to the other network device 210 via a set of links (e.g., member links of a LAG). In either case, network device 210 may identify a set of links that may be used to provide the network traffic toward a destination device associated with the network traffic.

In some implementations, network device 210 may identify a set of bandwidth values of the set of links. For example, network device 210 may search a data structure, and identify current statistics regarding bandwidth values of the set of links. In some implementations, a bandwidth value of a link may refer to a bandwidth usage value of the link, an available bandwidth value of the link, a capacity of the link, or the like. In this way, network device 210 may select a particular link, of the set of links, based on a bandwidth value of the link and the expected bandwidth value of the flow, as described below.

As further shown in FIG. 6, process 600 may include selecting a link, of the set of links, to provide network traffic associated with the flow based on the expected bandwidth value and a bandwidth value of the set of bandwidth values (block 650). For example, network device 210 may select a link after comparing a bandwidth value of the link and an expected bandwidth value of the flow.

In some implementations, network device 210 may use a link selection algorithm (e.g., a hashing algorithm, or the like) when selecting the link. For example, network device 210 may hash information associated with the flow (e.g., header information of the packet, or other information associated with the packet), and network device 210 may identify a link to use based on a result of the hashing algorithm. In this case, network device 210 may determine whether the identified link may support network traffic associated with the flow based on the expected bandwidth value of the flow.

In some implementations, network device 210 may compare a bandwidth value of a link and the expected bandwidth value of the flow. For example, network device 210 may compare the expected bandwidth value associated with the flow and the bandwidth value of a link (e.g., that was identified using the hashing algorithm) to determine whether the link can support the expected bandwidth value.

In some implementations, network device 210 may select a link that includes an available bandwidth value that is greater than the expected bandwidth value associated with the flow. Additionally, or alternatively, network device 210 may select a link that includes the most available bandwidth than as compared to other available links. In situations where an identified link (e.g., identified using a hashing algorithm) is not capable of supporting the expected bandwidth value (i.e., the expected bandwidth value is greater than an available bandwidth value of the link), network device 210 may select another link to use to provide the network traffic associated with the flow. In this way, network device 210 may reduce a number of situations where a particular link is over-utilized, thereby reducing communications issue.

In some implementations, network device 210 may compare bandwidth values of the set of links, and select a link based on comparing the bandwidth values. For example, network device 210 may identify a link that is under-utilized as compared to other available links based on comparing bandwidth values of the links. As an example, assume that a link includes an available bandwidth value that is greater than respective available bandwidth values of other links by more than a threshold quantity. In this case, network device 210 may select the link, such that the links are more similarly utilized. In other words, network device 210 may distribute flows across links in such a way that prevents both link over-utilization and link under-utilization. In this way, network device 210 may efficiently use network resources.

In some implementations, network device 210 may allocate resources towards a flow. As an example, assume that network device 210 processes a flow around a particular time of the day and requires, consumes, etc. a large quantity of bandwidth, exhibits particular burst characteristics, or the like. In this case, network device 210 may identify that the flow may be starting (e.g., based on historical data, based on flow set up information, etc.), and may allocate resources for the flow (e.g., distribute other flows to other links and reserve bandwidth of a particular link).

In some implementations, network device 210 may select a link based on an expected bandwidth value and/or another network metric value. For example, network device 210 may use an expected latency value, an expected burstiness value, an expected throughput value, or the like, when selecting a link. In other words, network device 210 may use an expected network metric value of the flow when selecting a link to use when providing the network traffic.

In this way, network device 210 may select a link that can accommodate network traffic associated with the flow, thereby reducing communication issues, such as high latency, packet loss, reduced throughput, etc. In this way, network device 210 conserves processor and/or memory resources of network device 210 and conserves network resources and/or utilizes network resources more efficiently.

As further shown in FIG. 6, process 600 may include providing the network traffic associated with the flow using the link (block 660). For example, network device 210 may provide, to another network device 210, the network traffic associated with the flow using the selected link.

In some implementations, network device 210 may determine whether the selected link is capable of accommodating the network traffic associated with the flow after selecting the link. For example, network device 210 may determine whether the selected link can provide the network traffic associated with the flow without causing communication issues. In some implementations, network device 210 may perform one or more operations of FIG. 6 in the situation where the selected link is not capable of accommodating the network traffic associated with the flow.

In some implementations, network device 210 may provide, to flow platform 220, additional telemetry information after providing the network traffic associated with the flow (e.g., to permit flow platform 220 to train (or re-train) a model). Additionally, or alternatively, network device 210 may provide, to flow platform 220, information that identifies an accuracy of an expected bandwidth value. In other words, network device 210 may provide feedback information to flow platform 220 to permit flow platform 220 to update a model, re-train a model, or the like, based on the accuracy of an expected bandwidth value.

In this way, some implementations described herein permit network devices 210 to more efficiently distribute flows across links. In other words, some implementations described herein permit network devices 210 to distribute flows across links such that particular links are not over-utilized and/or under-utilized. In this way, some implementations described herein conserve processor and/or memory resources of network devices 210 and conserve and/or more efficiently utilize network resources.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Some implementations described herein reduce a number of situations where particular links are over-utilized or under-utilized, thereby reducing communication issues and more efficiently allocating and/or using network resources. In this way, some implementations described herein conserve processor and/or memory resources of network devices and/or conserve network resources.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network device, comprising:
   one or more memories; and
   one or more processors to:
   receive information that permits the network device to identify a set of expected bandwidth values associated with a first set of flows,
   the information that permits the network device to identify the set of expected bandwidth values having been generated using a machine learning technique on telemetry information, associated with a second set of flows, from a set of network devices;
   receive network traffic associated with a flow of the first set of flows;
   identify an expected bandwidth value, of the set of expected bandwidth values, associated with the flow using the information that permits the network device to identify the set of expected bandwidth values;
   identify a set of bandwidth values of a set of links;
   compare the expected bandwidth value and the set of bandwidth values;
   select a link, of the set of links, to use when providing the network traffic associated with the flow based on comparing the expected bandwidth value and the set of bandwidth values of the set of links; and
   provide the network traffic on the link.

2. The network device of claim 1, where the one or more processors are further to:
   input a set of parameters, associated with the flow, into a model; and
   where the one or more processors, when identifying the expected bandwidth value associated with the flow, are to:
   identify the expected bandwidth value associated with the flow after inputting the set of parameters, associated with the flow, into the model.

3. The network device of claim 1, where the one or more processors are further to:
   store the expected bandwidth value associated with the flow; and
   where the one or more processors, when identifying the expected bandwidth value associated with the flow, are to:
   identify the expected bandwidth value associated with the flow after storing the expected bandwidth value associated with the flow.

4. The network device of claim 1, where the one or more processors are further to:
   provide, to a device, information that identifies the first set of flows; and
   where the one or more processors, when receiving the information that permits the network device to identify the set of expected bandwidth values associated with the first set of flows, are to:
   receive, from the device, the information that permits the network device to identify the set of expected bandwidth values after providing the information that identifies the first set of flows.

5. The network device of claim 1, where the one or more processors are further to:
   process the network traffic using a hashing algorithm;
   identify the link after processing the network traffic using the hashing algorithm; and
   where the one or more processors, when selecting the link, are to:
   select the link after identifying the link.

6. The network device of claim 1, where the one or more processors are further to:
   identify a time frame after receiving the network traffic; and
   where the one or more processors, when identifying the expected bandwidth value associated with the flow, are to:
   identify the expected bandwidth value based on the time frame.

7. The network device of claim 1, where the set of links is associated with at least one of:
   a link aggregation group; or
   a set of equal-cost multi-path paths.

8. A system comprising:
   one or more devices to:

receive telemetry information associated with a first set of flows;
process, using a machine learning technique, the telemetry information to determine information that permits the one or more devices to identify a set of expected bandwidth values associated with a second set of flows;
receive network traffic associated with a flow of the second set of flows;
identify an expected bandwidth value, of the set of expected bandwidth values, associated with the flow using the information that permits the one or more devices to identify the set of expected bandwidth values;
identify a set of bandwidth values of a set of links;
compare the expected bandwidth value and the set of bandwidth values;
select a link, of the set of links, to use when providing the network traffic associated with the flow based on comparing the expected bandwidth value and the set of bandwidth values; and
provide the network traffic on the link.

9. The system of claim 8, where the one or more devices are to:
train a model using the telemetry information; and
where the one or more devices, when identifying the expected bandwidth value, are to:
identify the expected bandwidth value using the model.

10. A method, comprising:
receiving, by a device and from a set of network devices, telemetry information associated with a first set of flows;
identifying, by the device, a set of actual bandwidth values of the first set of flows;
processing, by the device and using a machine learning technique, the telemetry information using the set of actual bandwidth values of the first set of flows to determine information that permits the set of network devices to identify a set of expected bandwidth values associated with a second set of flows; and
providing, by the device and to a network device of the set of network devices, at least a portion of the information, that permits the set of network devices to identify the set of expected bandwidth values associated with the second set of flows, to permit the network device to determine an expected bandwidth value, of the set of expected bandwidth values, associated with a flow of the second set of flows and select a link, of a set of links, to use when providing network traffic associated with the flow based on the expected bandwidth value.

11. The method of claim 10, further comprising:
training a model using the machine learning technique; and
where providing at least the portion of the information that permits the set of network devices to identify the set of expected bandwidth values comprises:
providing at least the portion of the information that permits the set of network devices to identify the set of expected bandwidth values after training the model.

12. The method of claim 10, further comprising:
determining the set of expected bandwidth values associated with the second set of flows; and
where providing at least the portion of the information that permits the set of network devices to identify the set of expected bandwidth values comprises:
providing at least the portion of the information that permits the set of network devices to identify the set of expected bandwidth values after determining the set of expected bandwidth values.

13. The method of claim 10, further comprising:
identifying a set of time frames associated with the telemetry information; and
where processing the telemetry information to determine the information that permits the set of network devices to identify the set of expected bandwidth values associated with the second set of flows comprises:
processing the telemetry information using the set of time frames.

14. The method of claim 10, further comprising:
identifying a set of applications associated with the telemetry information; and
where processing the telemetry information to determine the information that permits the set of network devices to identify the set of expected bandwidth values associated with the second set of flows comprises:
processing the telemetry information after identifying the set of applications.

15. The method of claim 10, further comprising:
receiving, from the network device, information that identifies the second set of flows; and
where providing, to the network device, at least the portion of the information that permits the set of network devices to identify the set of expected bandwidth values comprises:
providing at least the portion of the information based on receiving the information that identifies the second set of flows.

16. The method of claim 10, further comprising:
identifying that respective expected bandwidth values, of the second set of flows, satisfy a threshold,
the second set of flows being a subset of the first set of flows; and
where providing at least the portion of the information that permits the set of network devices to identify the set of expected bandwidth values associated with the second set of flows comprises:
providing at least the portion of the information based on identifying that the respective expected bandwidth values satisfy the threshold.

17. The method of claim 10, further comprising:
identifying a set of network metric values associated with the first set of flows; and
where processing the telemetry information to determine the information that permits the set of network devices to identify the set of expected bandwidth values associated with the second set of flows comprises:
processing the telemetry information using the set of network metric values.

18. The system of claim 8, where the one or more devices are further to: process the network traffic using a hashing algorithm; and identify the link after processing the network traffic using the hashing algorithm.

19. The system of claim 8, where the set of links is associated with at least one of: a link aggregation group; or a set of equal-cost multi-path paths.

20. The system of claim 8, where the one or more devices are further to: store the expected bandwidth value associated with the flow; and
where the one or more devices, when identifying the expected bandwidth value associated with the flow, are to:

identify the expected bandwidth value associated with the flow after storing the expected bandwidth value associated with the flow.

\* \* \* \* \*